Patented May 3, 1938

2,116,321

UNITED STATES PATENT OFFICE 2,116,321

SUBSTANTIALLY INSOLUBLE INK DRIER AND METHOD OF PRODUCING THE SAME

Arthur Minich, Newark, N. J., assignor to Nuodex Products Co., Inc., a corporation of New York No Drawing. Application May 22, 1935, Serial No. 22,786

9 Claims. (Cl. 134—57)

This invention is directed generally to driers, but primarily to driers for printing inks and relates more particularly to the production of driers embodying basic metallic salts of naphthenic acid (cyclo-pentane-carboxylic acid).

My investigations and research have demonstrated that a drier must not only possess the inherent ability to dry when embodied in the ultimate composition, but that it must be free from certain deleterious actions which would render it unsuitable for use as such. For example, the drier must have inherent drying properties to a sufficient degree to make it efficient as such. Furthermore, it should not appreciably affect the viscosity of the material in which it is used. It should not tend to liver and, if possible, should tend to inhibit or prevent livering particularly in inks which have such tendencies. It should produce little if any discoloration particularly when used in conjunction with inks of delicate shades. In order to be efficient the driers should have a relatively high metal content and the amount of extraneous material therein should be maintained at a minimum. It must be such as to be readily incorporated in the vehicle in which it is to be used. It must not interfere with or detrimentally affect the bonding of the ink to the surface to which the ink is applied. It must be stable or permanent and must not change color on ageing. It is furthermore highly desirable that the driers do not impart a stickiness to the ink, as this tends to cause adhesion between superimposed printed sheets which is highly undesirable and inconvenient.

It has long been the practice in the art of ink driers, to produce driers of soluble character, i. e., driers which may be dissolved in oils of the inks in which they are used or in spirits, and in many cases, such driers have also been soluble in water. The driers heretofore used in printing ink are unsatisfactory in many respects. They may be briefly classified under two main headings, namely, one containing inorganic compounds and the other in which the drying metal is bound to an organic radical. Lead acetate and manganese borate are examples of the first class. They are commonly employed, but are objectionable in that they are water soluble and their activity per metal content is relatively low and their drying performance uncertain. They are furthermore difficult to bring into suitable form for incorporation in the ink and have a tendency to increase the viscosity of the ink. The other class of driers is exemplified by cobalt linoleate, manganese resinate, manganese linoleate, etc. They are usually in solid form, which necessitates their being made into a paste before use and they are consequently difficult to manipulate. Their metal content is relatively low and consequently in order to introduce the necessary amount of drying metal, a relatively large percentage of extraneous material must be incorporated. Furthermore, driers of this kind are unstable on aging and have a tendency to badly discolor pale inks. They materially lower the viscosity of the ink to which they are added and also tend to produce a sticky condition thereon.

With these considerations in mind, one object of the present invention is to provide a drier, and more particularly a drier for printer's ink, which will be free from the objections specified and at the same time embody the desirable characteristics to which I have referred.

Speaking generally, the drier of the present invention may be characterized as a substantially insoluble basic metal salt of naphthenic acid. That is to say, a metal salt of such acid which will be substantially insoluble, not only in the vehicle in which it is used, such as oil, but will also be insoluble in water and so permit of its use, particularly in printing inks which are to be employed in conjunction with wet blanket impressions in lithography. By producing a basic salt of the naphthenic acid, I am able to incorporate in this salt an unusually high metallic content without a relatively high percentage of extraneous material and the efficiency of the drying metal in the compound of this invention is found to be materially enhanced. Furthermore, I am able to produce in a manner hereinafter more specifically set forth, a substantially insoluble basic metal salt of naphthenic acid in powdered form, a form in which it may be readily handled, easily introduced into the vehicle in which it is to be used and thoroughly and efficiently admixed therewith in substantially homogeneous dispersement. This is highly important from the printers' standpoint and is in marked contrast with many prior driers which may be only incorporated in printing inks with considerable difficulty.

While various metals may be employed according to this invention, I find very satisfactory results may be obtained through the employment of cobalt, manganese, and lead to produce, as end products, basic salts of naphthenic acid containing cobalt, manganese, lead, etc. in relatively high percentages.

To conveniently carry out the invention from the standpoint of the method and process, the metal, preferably in the form of a suitable water soluble salt thereof, is brought into aqueous solution and this solution is thereupon commingled, as hereinafter described, with an aqueous soap solution of naphthenic acid embodying an appreciable quantity of free alkali. In other words, the two bodies of aqueous solution are independently formed and one is thereupon slowly introduced into the other, i. e., one is slowly run into the other, with accompanying agitation so as to bring about a thorough commingling of the two solutions. Agitation is preferably continued for a time, after which the magma is permitted to settle or precipitate. Liquid is drawn off and the precipitate is washed, filtered and dried leaving the desired end product constituting the present invention. This end product may, if desired, be ground into fine powdered form.

Features of the invention other than those specified will be apparent from the following detailed description and claims.

In practically carrying out the invention for the production, for example, of an ink drier embodying a basic cobalt salt of naphthenic acid, having an 18 per cent metal content, I preferably proceed as follows. Into 400 gallons of cold water, I introduce 91 pounds of flake caustic soda containing 76% sodium oxide. The apparatus used includes an agitator of some sort which may conveniently be a blade agitator and this agitator is operated during the introduction of the caustic soda to bring the caustic soda into solution. After this solution has been accomplished, I add thereto approximately 272 pounds of naphthenic acid of an acid number from 240-260 and bring into solution by continued agitation to produce a sodium naphthenate soap. In a separate tank, containing 70 gallons of cold water, and having a suitable agitator, 330 pounds of cobalt sulphate crystals, containing about 21 per cent metal, are dissolved. The cobalt solution thus formed is run slowly into the sodium naphthenate soap, which has an excess of caustic, while the latter is constantly agitated and thereupon the agitation is discontinued and a blue flocculent precipitate is formed.

This precipitate may readily be washed free from the by-product salts in any suitable way as by washing or filtration, or both, and yields a loose cake after drying. The drying may be accomplished as ordinary air drying or through the use of heat. The loose cake, in the example given, will contain 18% cobalt metal content and, if desired, may be readily ground to a fine powder well adapted for incorporation in printing inks.

The example given is a practical, specific one for the manufacture of commercial cobalt driers which has been found to be highly efficient in practice. The acid specified preferably has an acid number of between 240-260 and I have found such acid to give very satisfactory results. It may be possible, however, to use acid of a higher or lower acid number and a considerably higher acid number might well be employed, but care must be exercised in using lower acid numbers, for as the acid number decreases, less metal will be taken up and the resulting product will be apt to be unstable or sticky, or both.

It will of course be understood in this connection that the quantities of the constituents entering into the example given may be varied within reasonable limits, but variations therein will affect the metal content in the end product, as well as certain other characteristics such as the drying efficiency of the product. For example, when the naphthenic acid was decreased from 272 pounds to 200 pounds or even lower, then compounds were obtained which possess satisfactory color and yielded fine powders, but, when tested for their drying efficiency per unit of weight of metal present, it was observed that they were not as efficient as the 18 per cent formula given. On the other hand, when the amount of naphthenic acid was increased from 272 to 350 pounds then the resulting cobalt compound no longer represented a fine and loose powder, but was sticky and on the border line of a solid or plastic material. Thus while it will appear that certain modifications may be made within the present invention in the foregoing formula, that too wide a variation, outside of the realm of equivalents, is not feasible. The example given may be said to be optimum, as it produces a very fine high grade cobalt drier well adapted for commercial purposes.

It may be here noted that in the example given, the sulphate solution has been described as introduced into the soap solution, but it is possible to reverse this procedure if desired.

The acid employed should be of a pale color and should have a mild odor, so as not to detrimentally influence the color of the ink in which it is used or impart a foreign odor thereto.

The cobalt drier made as specified is entirely insoluble in water. In fact, it is a water repellant. It is so slightly soluble in oil as to be substantially insoluble therein. It may be used in ink by simply grinding it in with other pigments used in the formation of the ink or, if desired, a paste drier may be prepared by first grinding it into a lithographic oil. It may be sold in this paste form or in the powdered form. In practice, it disperses very easily in oil or in an ink, does not detrimentally affect the ink in any way and constitutes an efficient drier therein.

In practically carrying out the invention for the production, for example, of an ink drier embodying a basic manganese salt of naphthenic acid having a 24 per cent metal content, I preferably proceed as follows.

100 pounds of flake caustic soda containing 76 per cent sodium oxide is brought into solution with 240 gallons of cold water by agitation, and after the solution is produced, 212 pounds of naphthenic acid, having an acid number of 240-260, is added and agitated until homogeneous solution is produced. In a separate tank, 250 pounds of a manganese sulphate, representing approximately 78 pounds of manganese metal, is brought into solution with 120 gallons of water. After all the salt has been dissolved by agitation, the resulting solution is run slowly into the soap-caustic mixture, while the latter is constantly agitated. After a period, agitation is discontinued and a light brown flocculent precipitate results. This may easily be freed from the by-product salts by washing or filtration, or both. The end product, after drying, is a loose cake which may be readily ground and screened to produce a fine powder. The metal content of this powder will be found to be 24 per cent, which practice has demonstrated to be highly efficient as a drier in printing inks.

Experiments and tests have indicated that, when the amount of acid used is increased to 300 pounds or higher, the resulting compounds no longer yield a fine and dry powder but represent a sticky mass which is difficult to handle. If the amount of acid is decreased much below 212 pounds, the resulting manganese compound has a marked tendency to rapidly deepen in color when exposed to air in the form of a wet cake before drying. Furthermore, a manganese compound containing a relatively lower amount of naphthenic radical than will result when 212 pounds of naphthenic acid are used in the formula will not dry as well per unit of weight of metal present as the 24 per cent concentration. The 24 per cent therefore has been chosen for the purpose of this example as an optimum formula. Thus, while certain modifications may be made in the foregoing example, such modifications must be made within the range of equivalents as pointed out in connection with the cobalt example in order not to detrimentally affect the product or its uses.

In the manganese formula given, the acid used should also have a pale color and a mild odor, so as not to be objectionable for the purposes stated.

In practically carrying out the invention for the production, for example, of an ink drier embodying a basic lead compound having a 64 per cent metal content, I preferably proceed as follows. Under constant agitation, 150 pounds of lead oxide are added slowly to 60 gallons of water. After a homogeneous magma has been formed, 60 pounds of glacial acetic acid is slowly added and, after a solution is formed, an additional 100 gallons of water is introduced.

In a separate apparatus 40 pounds of flake caustic soda of 76 per cent sodium oxide is brought into solution in 60 gallons of water and after this solution has been effected, 50 pounds of naphthenic acid of an acid number from 240–260 is added. After the soap-caustic mixture has been prepared, it is then slowly run into the suspension of basic lead acetate under constant agitation and the agitation is continued for a period. Thereupon the magma is freed from by-product salts by washing or filtration or both. The end product, after drying, is a loose cake which may be readily powdered and screened to produce a water white powder, very fine and of very mild odor containing 64 per cent lead metal. The particular concentration of 64 per cent metal referred to was arrived at after tests indicated that if the amount of naphthenic acid was increased materially over 60 pounds, as mentioned in the formula, the resulting product would no longer yield a loose powder, but would form a sticky material difficult to handle. If the amount of naphthenic acid was decreased materially below 60 pounds, the resulting product did not dry as well per unit of weight of metal present as the 64 per cent concentration. Thus, while the formula may be varied within the range of equivalents, without departing from this invention, material change detrimentally affects the product.

Inasmuch as a white product is desired, the acid used should be as near water white as possible and the odor should be sufficiently mild as not to unduly scent the ink in which the drier is to be used.

I have hereinbefore given illustrative examples involving cobalt, manganese and lead. Other metals having drying characteristics may be used in the same way and will produce corresponding basic metal salts of naphthenic acid in the form of dry powders.

Experimentation and research have shown that through the production of the cobalt, manganese and lead powders, which I have hereinbefore described, these three powders meet practically all requirements in the printing ink industry. They may be used in some cases separately and in other cases in combination with one another to meet specific drying requirements of particular inks, as will be well understood by those skilled in the art of printing inks, so that further elucidation or examples on other metals is not considered necessary here.

My experiments, as well as thorough research, have proven that the ink driers which I have described possess all the necessary requisites to give complete satisfaction in the printing art. For example, they have high metal content with a minimum of extraneous material. They may be made and sold in powdered form which makes them far easier to handle. They are easily wetted with lithographic varnish and are completely dispersed in the varnish and result in a smooth gritless uniform drier. By changing the type of the lithographic varnish and the proportions of the drier and varnish used, paste driers of practically any consistency and drying characteristics may be obtained.

The driers of this invention do not require the addition of fatty acids to stabilize them. The neutral nature of the driers therefore tends to keep them from being absorbed or poisoned through interaction with other ingredients of the ink, so that they may be kept through long periods without deterioration in the vehicle. They appear to have a very marked tendency to toughen or harden the ink as compared with prior drying compositions embodying the same metals. The non-reactive nature of the driers of this invention is a real advantage in metallic ink vehicles as it reduces the tendency to tarnish the bronze powder or to body-up in the containers. Furthermore, metallic ink when containing driers of this invention shows an improved adhesion as compared with the same ink containing corresponding driers made according to prior practice. Furthermore, the driers of the present invention are not so apt to cause discoloration or change the colors of the ink in which they are introduced. For example, the lead compound which I have described will produce no discoloration of the ink, whereas lead linoleate of the prior art is apt to produce a pronounced discoloration. Similarly, the cobalt drier described will produce a purer white ink than any other cobalt drier of which I am aware and the manganese composition will produce little or no stain as compared to the manganese borate of prior practice when introduced in quantities to give the same drying performance.

Experience has shown that the high metallic content of the compounds as described is very efficient in its drying performance as compared with the corresponding metals in compounds heretofore used. For example, one pound of metal contained in the lead formula hereinbefore given is three times as efficient as one pound of lead metal contained in the commercial lead acetate drier which is commonly used in the art of printing ink. Furthermore, one pound of manganese metal contained in the manganese formula hereinbefore given possesses an efficiency which is five times greater than that of one pound of manganese metal contained in the commercial manganese borate now commonly used in the printing art as a drier.

In connection with the formulas hereinbefore described, I have referred primarily to the metal sulphates and acetates, as these may be conveniently used, but I wish it understood that I may use other water soluble salts of these metals in carrying out the method of this invention.

I have hereinbefore described naphthenic acid as the acid which I employ and as the basis of the metal salt which is my end product. It is entirely possible, however, that some other acid or acid radical may be known or obtainable which will embody substantially the same characteristics and which will operate in substantially the same way in the carrying out of my process and will produce substantially the same products as the end products which I have hereinbefore described, for all practical purposes. For this reason, I wish it clearly understood that the present invention is sufficiently comprehensive to cover these clear chemical equivalents and is not restricted specifically to naphthenic acid. Similarly, other alkalies than sodium hydroxide may be employed.

In the foregoing detailed description, I have dealt with the present invention as particularly directed to the production of drying compositions for printing inks as it is for this environment that they were initially conceived. It is entirely possible, however, that the said compositions may be used as driers in other connections and that they may also have different uses than hereinbefore specifically enumerated.

In the course of my experiments, I also produced a copper naphthenate by following the general procedure hereinbefore specified, that is to say, 36 grams of naphthenic acid of an acid number of 240–260 and 32 grams of flake caustic soda, and 50 grams of glucose solution (50% concentration) were dissolved in 200 grams of water and to this solution was added a solution composed of 300 grams of water and 110 grams of cupric sulphate (25 parts metal). I obtained after washing and filtration a light green powder containing about 35 per cent of copper metal. It is believed that this insoluble copper salt of naphthenic acid may have particular uses in the various arts, such, for example, as a fungicide.

The end products which I have hereinbefore described have the characteristic that they possess marked insolubility in oil or spirits, as compared with the driers of the prior art, and they may therefore be properly termed as substantially insoluble although not entirely insoluble.

The foregoing detailed description sets forth the invention in its preferred practical forms, but the invention is to be understood as fully commensurate with the appended claims.

Having thus fully described the invention, what I claim as new and desire to secure by Letters Patent is:

1. As a new article of manufacture, an ink drier comprising a powder of precipitated hydroxy drying metal salt of naphthenic acid and which powder is substantially insoluble in water and drying oils at a temperature below the decomposition temperature of said salt.

2. As a new article of manufacture, an ink drier comprising a powder embodying a plurality of different precipitated hydroxy drying metal salts of naphthenic acid and which powder is substantially insoluble in water and drying oils at temperatures below the decomposition temperatures of said salts.

3. As a new article of manufacture, an ink drier comprising a powder of precipitated hydroxy lead salt of naphthenic acid and which powder is substantially insoluble in water and drying oils at a temperature below the decomposition temperature of said salt.

4. As a new article of manufacture, an ink drier comprising a powder of precipitated hydroxy cobalt salt of naphthenic acid and which powder is substantially insoluble in water and drying oils at a temperature below the decomposition temperature of said salt.

5. As a new article of manufacture, an ink drier comprising a powder of precipitated hydroxy manganese salt of naphthenic acid and which powder is substantially insoluble in water and drying oils at a temperature below the decomposition temperature of said salt.

6. The herein described process of making an oil and water-insoluble hydroxy drying metal salt of naphthenic acid in finely divided form, which consists in producing an aqueous solution containing a naphthenic acid salt of an alkali metal and free hydroxide of such alkali metal, separately producing an aqueous solution of a water-soluble inorganic salt of a drying metal in excess of the amount to molecularly react with the normal alkali salt of naphthenic acid for reacting with the caustic alkali, thereafter introducing one of said separately produced solutions into the other to form hydroxy metal naphthenate, thereafter freeing said hydroxy metal naphthenate from by-product salts, and drying said metal naphthenate to a powder.

7. An ink drier comprising a dry powder of precipitated hydroxy cobalt salt of naphthenic acid having a metal concentration of approximately 18% and which powder is substantially insoluble in water and drying oils at a temperature below the decomposition temperature of said salt.

8. An ink drier comprising a dry powder of precipitated hydroxy manganese salt of naphthenic acid having a metal concentration of approximately 24% and which powder is substantially insoluble in water and drying oils at a temperature below the decomposition temperature of said salt.

9. An ink drier comprising a dry powder of precipitated hydroxy lead salt of naphthenic acid having a metal concentration of approximately 64% and which powder is substantially insoluble in water and drying oils at a temperature below the decomposition temperature of said salt.

ARTHUR MINICH.